(12) United States Patent
Yoo et al.

(10) Patent No.: US 7,816,851 B2
(45) Date of Patent: Oct. 19, 2010

(54) PLANAR LIGHT SOURCE DEVICE AND LIQUID CRYSTAL DISPLAY DEVICE HAVING THE SAME

(75) Inventors: Hyeong-Suk Yoo, Yongin-si (KR); Seung-Ki Joo, Seongnam-si (KR); Myong-Hi Rhee, Seoul (KR); In-Sun Hwang, Suwon-si (KR); Hae-Il Park, Seoul (KR); Sung-Lak Choi, Osan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 647 days.

(21) Appl. No.: 11/479,615

(22) Filed: Jun. 30, 2006

(65) Prior Publication Data

US 2007/0040960 A1    Feb. 22, 2007

(30) Foreign Application Priority Data

Jul. 2, 2005     (KR) .................. 10-2005-0059463

(51) Int. Cl.
*H01J 1/62*     (2006.01)
*H01J 63/04*    (2006.01)

(52) U.S. Cl. .................. 313/495; 313/496; 313/497; 313/483; 313/293

(58) Field of Classification Search ............. None
See application file for complete search history.

(56) References Cited

U.S. PATENT DOCUMENTS

| | | | |
|---|---|---|---|
| 5,506,476 A | | 4/1996 | Lee et al. |
| 6,404,113 B1 * | | 6/2002 | Okamoto ............. 313/309 |
| 6,650,061 B1 * | | 11/2003 | Urayama et al. ......... 315/169.3 |
| 6,855,376 B2 * | | 2/2005 | Hwang et al. .......... 427/404 |
| 6,900,066 B2 * | | 5/2005 | Toyota et al. .......... 438/20 |
| 6,922,016 B2 * | | 7/2005 | Yoo et al. ............ 313/607 |
| 7,652,418 B2 * | | 1/2010 | Choi et al. ........... 313/497 |
| 2001/0007783 A1 | | 7/2001 | Lee et al. |
| 2002/0036599 A1 * | | 3/2002 | Nishimura et al. ....... 345/11 |
| 2004/0032194 A1 * | | 2/2004 | Koga et al. ........... 313/309 |
| 2006/0049742 A1 * | | 3/2006 | Lee et al. ............ 313/496 |

FOREIGN PATENT DOCUMENTS

| | | |
|---|---|---|
| CN | 1417829 | 5/2003 |
| JP | 2003-277034 | 10/2003 |

OTHER PUBLICATIONS

English Language Abstract, Publication No. 2003-277034, Oct. 2, 2003, 1 p.

* cited by examiner

*Primary Examiner*—Nimeshkumar D Patel
*Assistant Examiner*—Natalie K Walford
(74) *Attorney, Agent, or Firm*—Innovation Counsel LLP

(57) ABSTRACT

A planar light source device includes a lower substrate, a cathode electrode a carbon nanotube, an upper substrate, a fluorescent layer, and an anode electrode. The cathode electrode is on the lower substrate. The carbon nanotube is electrically connected to the cathode electrode. The upper substrate faces the lower substrate. The fluorescent layer and the anode electrode are formed on the upper substrate. Therefore, the planar light source device generates light without using mercury.

8 Claims, 14 Drawing Sheets

Ni/Pt/GLASS

Ni/Cr/GLASS

Ni/W/GLASS

Ni/MoW/GLASS

Ni/Mo/GLASS

Ni/Cu/GLASS

Ni/Ag/GLASS

Ni/Ti/Pt/GLASS

Ni/Ti/Cr/GLASS

Ni/Ti/GLASS

1:1

2:1

4 : 1

6 : 1

PLANAR LIGHT SOURCE DEVICE AND LIQUID CRYSTAL DISPLAY DEVICE HAVING THE SAME

CROSS-REFERENCE TO RELATED APPLICATIONS

The present application claims priority from Korean Patent Application No. 2005-59463, filed on Jul. 2, 2005, the disclosure of which is hereby incorporated herein by reference in its entirety.

BACKGROUND OF THE INVENTION

1. Field of the Invention

The present invention relates to a planar light source device and a liquid crystal display (LCD) device having the planar light source device. More particularly, the present invention relates to a field emission-type planar light source device, and an LCD device having the planar light source device.

2. Description of the Related Art

Various flat display panel devices, such as liquid crystal display (LCD) devices, plasma display panel (PDP) devices, organic light-emitting diode (OLED) devices, etc., have been developed to replace cathode ray tube (CRT) devices.

The LCD device that is widely used in various fields includes an LCD panel that has a thin-film transistor (TFT) substrate, a color filter substrate, and a liquid crystal layer interposed between the TFT substrate and the color filter substrate. The LCD panel is a non-emissive-type display element, and thus the LCD device requires a backlight unit that is disposed under the TFT substrate to supply the LCD panel with light. A liquid crystal of the liquid crystal layer varies arrangement in response to an electric field applied thereto, and thus a light transmittance of the liquid crystal layer is changed, thereby displaying an image having a predetermined gray-scale.

A light source of the backlight unit includes a cold cathode fluorescent lamp (CCFL), an external electrode fluorescent lamp (EEFL), a flat fluorescent lamp (FFL) that is a type of planar light source, etc. Each of the CCFL, EEFL, and FFL generates light using a plasma discharge. When a high voltage difference is applied to electrodes of the lamp, an electric field is formed between the electrodes to emit electrons. The electrons excite mercury molecules, and ultraviolet light is generated from the excited mercury molecules. A fluorescent layer changes the ultraviolet light into visible light so that the visible light exits the lamp. However, mercury is a pollutant and is restricted by environmental regulations. Thus, a light source that does not use mercury is required.

SUMMARY OF THE INVENTION

The present invention provides a field emission-type planar light source device.

The present invention also provides a liquid crystal display (LCD) device having the above-mentioned planar light source device.

A field emission-type planar light source device in accordance with one aspect of the present invention includes an emitter tip including a carbon nanotube and a cathode electrode having a charge transition rate of no more than about $10^{-6.1}$ A/cm$^2$.

A field emission-type planar light source device in accordance with another aspect of the present invention includes an emitter tip including a carbon nanotube, a gate electrode surrounding an upper portion of the emitter tip and a catalyst metal accelerating growth of the carbon nanotube on the gate electrode.

A field emission-type planar light source device in accordance with still another aspect of the present invention includes a lower substrate, a cathode electrode including at least two layers on the lower substrate, a carbon nanotube grown on the cathode electrode and an upper substrate facing the lower substrate, the upper substrate including a fluorescent material and a transparent electrode.

The cathode electrode may include a charge transition rate per unit area of no more than about $10^{-6.1}$ A/cm$^2$. The cathode electrode may have a double-layer structure including a lower cathode electrode layer and an upper cathode layer, and the lower cathode electrode layer may include substantially the same material as the gate electrode.

The gate electrode may include a material having a charge transition rate per unit area of no less than about $10^{-6.0}$ A/cm$^2$.

An LCD (LCD) device in accordance with one aspect of the present invention may include the planar light source device and an LCD panel on the planar light source device.

A frequency of a voltage applied to the gate electrode may be substantially the same as a driving frame frequency of the LCD panel or N times the driving frame frequency of the LCD panel, wherein N is an integer.

A method of manufacturing a planar light source device in accordance with one aspect of the present invention includes selectively growing a carbon nanotube on a cathode electrode of a lower substrate in a chamber.

A method of manufacturing a planar light source device in accordance with another aspect of the present invention is provided as follows. A cathode electrode including at least one layer is formed on a lower substrate. A gate electrode electrically insulated from the cathode electrode is formed on the cathode electrode. The cathode electrode is exposed through an opening of the gate electrode. A catalyst metal layer is formed on the gate electrode and the cathode electrode in the opening of the gate electrode. A carbon nanotube is grown on the cathode electrode in the opening of the gate electrode using the catalyst metal layer. An upper substrate including a fluorescent material and a transparent electrode is formed. The upper substrate faces the lower substrate.

The catalyst metal layer may be preprocessed under an ammonia atmosphere to form the catalyst metal layer.

The carbon nanotube may be formed under an atmosphere of a mixture of ammonia (NH$_3$) gas and a hydrocarbon gas.

The planar light source device may be manufactured through a single photo process to form the gate electrode pattern.

An LCD device in accordance with one aspect of the present invention may be manufactured by forming an optical film on the planar light source device, and arranging an LCD panel on the optical film.

DESCRIPTION OF THE EMBODIMENTS

Figure 1:
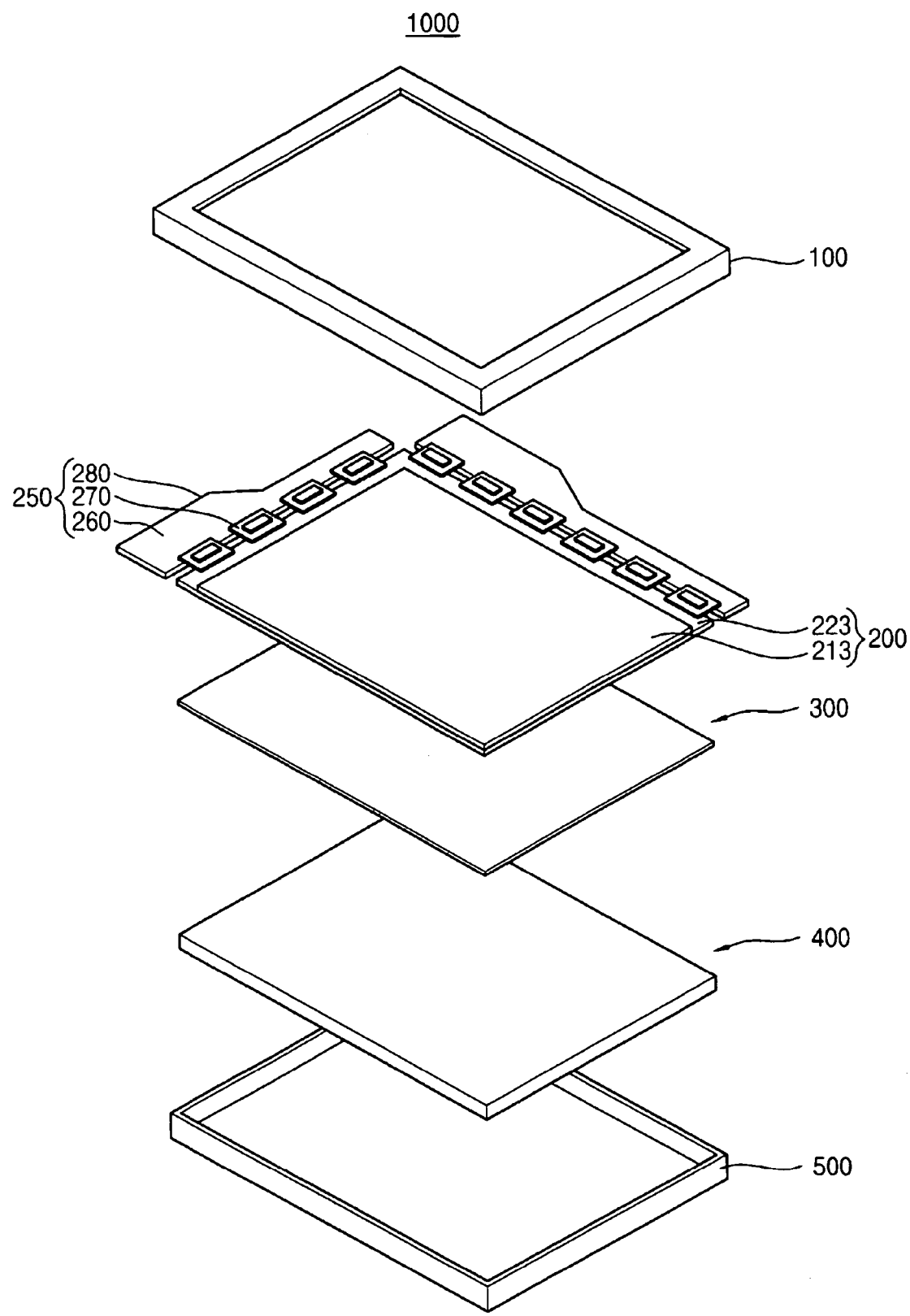
FIG. 1 is an exploded perspective view illustrating a liquid crystal display (LCD) device in accordance with one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described, in detail with reference to the accompanying drawings.

FIG. 1 is an exploded perspective view illustrating a liquid crystal display (LCD) device in accordance with one embodiment of the present invention.

Referring to FIG. 1, the LCD device 1000 includes an LCD panel 200, an optical member 300, and a planar light source device 400. The optical member 300 is on a rear surface of the LCD panel 200. The planar light source device 400 supplies the optical member 300 with light. The LCD panel 200, the optical member 300, and the planar light source device 400 are received between an upper chassis 100 and a lower chassis 500.

The LCD panel 200 includes a thin-film transistor (TFT) substrate 213, a color filter substrate 223, a sealant, and a liquid crystal layer. The color filter substrate 223 faces the TFT substrate 213. The TFT substrate 213 is combined with the color filter substrate 223 through the sealant. The liquid crystal layer is interposed between the TFT substrate 213, the color filter substrate 223, and the sealant. The liquid crystal layer of the LCD panel 200 typically is a non-emissive-type element so that the LCD device 1000 can employ the planar light source device 400 that is on the rear surface of the LCD panel 200 to supply light to the LCD panel 200. A driving part 250 applying driving signals is on a side of the TFT substrate 213.

The driving part 250 includes a flexible printed circuit board (FPC) 260, a driving chip 270, and a printed circuit board (PCB) 280. The driving chip 270 is on the FPC 260. The PCB 280 is electrically connected to the FPC 260. The driving part 250 may include without limitation a chip-on-film (COF) structure, a tape carrier package (TCP) structure, or a chip-on-glass (COG) structure. Alternatively, the driving part 250 may be directly formed on the TFT substrate 213 with lines and pixels of the TFT substrate 213.

The optical member 300 that is on the rear surface of the LCD panel 200 may include a base film, and an optical pattern that is formed on the base film. The optical member 300 may include without limitation a light-diffusion plate, a prism sheet, a recycling film, a transreflective film, a brightness enhancement film, or a dual brightness enhancement film.

The base film includes a transparent material, and is aligned substantially parallel with the LCD panel. The optical pattern may include a plurality of lenses formed on the base film facing the LCD panel 200. Examples of the transparent material that can be used for the base film include without limitation polyethylene terephthalate (PET), polycarbonate (PC), and cyclo-olefin polymer (COP). These can be used alone or in a combination thereof. The optical pattern may include substantially the same material as the base film, and may be integrally formed with the base film. The optical pattern diffuses the light that is incident into the optical member 300. The optical pattern may have a bead shape. The optical pattern may be formed on substantially the entire surface of the base film.

Figure 2:
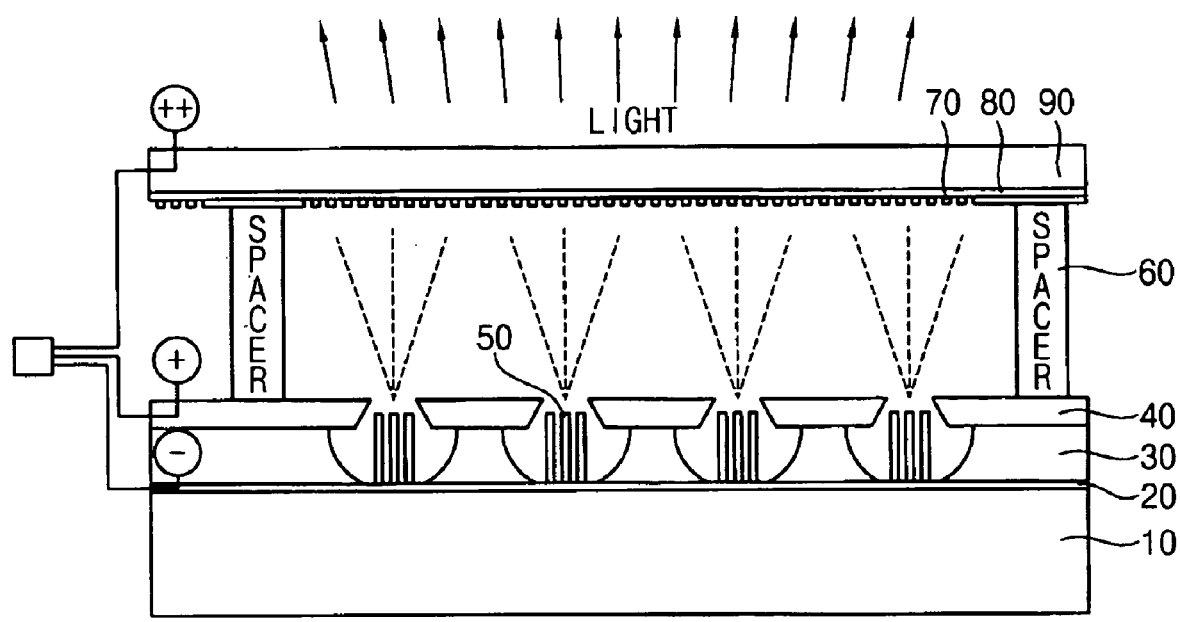
FIG. 2 is a cross-sectional view illustrating a planar light source device in accordance with one embodiment of the present invention.

FIG. 2 is a cross-sectional view illustrating a planar light source device in accordance with one embodiment of the present invention.

Referring to FIG. 2, the planar light source device 400 generates the light using a field emission effect. The planar light source device 400 includes a lower substrate 10, and an upper substrate 90 that is combined with the lower substrate 10 to form an emission space. Each of the respective lower and upper substrates 10 and 90 include a transparent insulating material. Examples of the transparent insulating material that can be used for the respective lower and upper substrates 10 and 90 include without limitation glass and quartz.

A cathode electrode 20 is formed on the lower substrate 10. The cathode electrode 20 may have a single-layer structure or may have a multilayer structure. The cathode electrode 20 may include a conductive material such as a metal.

A supporting portion 30 and a gate electrode 40 are formed on the lower substrate 10. The supporting portion 30 is protruded toward a front portion of the lower substrate 10. The gate electrode is on the supporting portion 30. A plurality of grooves is formed on adjacent portions of the supporting portion 30.

The cathode electrode 20 is partially exposed through the grooves. That is, a region corresponding to the gate electrode 40, and an exposed region in which the cathode electrode 20 is partially exposed through an opening between adjacent portions of the gate electrode 40, are defined on the lower substrate 10. The cathode electrode 20 may be a metal layer formed on substantially the entire surface of the lower substrate 10. In addition, the gate electrode 40 also may be a metal layer formed on substantially the entire surface of the supporting portion 30. For example, the light generated from the planar light source device may be a white light, and the LCD panel 200 may display an image by using the white light emitted from the planar light source 400.

The supporting portion 30 includes an insulating material. Examples of the insulating material that can be used for the supporting portion 30 include without limitation silicon oxide, silicon nitride, and organic material.

A plurality of carbon nanotubes 50 is formed as emitter tips in the grooves on the cathode electrode 20. The carbon nanotubes 50 emit electrons based on a voltage that is received from the cathode electrode 20. The carbon nanotubes 50 may grow on the cathode electrode 20. Alternatively, the carbon nanotubes 50 may be formed on the cathode electrode 20 using a mixture of a carbon nanotube material and a high polymer.

The gate electrode 40 is on the supporting portion 30. A height of the gate electrode 40 may be greater than that of the carbon nanotubes 50.

The emission space between the respective lower and upper substrates 10 and 90 may be in a vacuum state, so that the planar light source device 400 may benefit from a spacer 60 to maintain a distance between the respective lower and upper substrates 10 and 90.

An anode electrode 80 and a fluorescent layer 70 are formed on the upper substrate 90, desirably in sequence. The anode electrode 80 includes a transparent conductive material to accelerate electrons emitted from the carbon nanotubes 50. Examples of the transparent conductive material that can be used for the anode electrode 80 include without limitation indium tin oxide (ITO) and indium zinc oxide (IZO). The fluorescent layer 70 may include a plurality of phosphor particles. The fluorescent layer 70 generates light based on the electrons exciting the phosphor particles. The light generated from the fluorescent layer 70 may be a white light. In FIG. 2, red (R), green (G), and blue (B) fluorescent materials are mixed to form the fluorescent layer 70, so that R, G, and B lights are mixed to form a white light including the three color types of red, green, and blue. Thus, the white light, including the three color types is emitted from the front surface of the planar surface light source. Alternatively, R, G, and B fluorescent portions may be spaced apart from each other by a substantially constant distance so that the planar light source device 1000 emits the light of the three color types. When the R, G, and B fluorescent portions are spaced apart from each other, the R, G, and B lights are mixed in a space between the planar light source device 400 and the LCD panel 200.

Alternatively, the anode electrode 80 may be formed on an outer surface of the upper substrate 90, and a protective layer is formed on the anode electrode 80. Exemplary protective layers may include without limitation a silicon nitride layer, a silicon oxide layer, and a high polymer layer that transmits the light.

A voltage having a predetermined frequency may be applied to the gate electrode 40. The carbon nanotubes 50 may emit electrons based on a voltage difference between the gate electrode 40 and the carbon nanotubes 50. The electrons are accelerated by the voltage applied to the anode electrode 80 so that the electrons are impacted onto the fluorescent layer 70. The frequency of the voltage $f_{Vg}$ applied to the gate electrode 40 may be substantially the same as a frame frequency $f_{Fp}$ of the LCD panel 200, or as a frequency several times higher than the frame frequency of the LCD panel 200. That is, $f_V=nf_F$, for integer values of n from 1 to N, inclusively. In selected embodiments, the frame frequency of the LCD panel 200 may be substantially the same as the frequency of the voltage applied to the gate electrode 40. For example, when the frame frequency of the LCD panel 200 is about 60 Hz or about 120 Hz, the frequency of the voltage applied to the gate electrode 40 may be about 60 Hz or about 120 Hz. In selected other embodiments the frequency of the voltage applied to the gate electrode 40 may be several times higher than about 60 Hz or about 120 Hz. When the frame frequency of the LCD panel 200 is synchronized with the frequency of the voltage applied to the gate electrode 40, a black image may be inserted into a region between adjacent images. The inserted black image precisely defines a boundary between the adjacent images to improve image display quality of the LCD device 1000.

In general, a voltage of a negative level is applied to the cathode electrode 20, and a voltage of a positive level is applied to the gate electrode 40 and to the anode electrode 80. A voltage difference is formed between the cathode electrode 20 and the gate electrode 40 so that the electric field is formed therebetween and effecting emission of electrons by the carbon nanotubes 50. The electrons emitted from the carbon nanotubes 50 are accelerated toward the anode electrode 80, by an electric field formed between the cathode electrode 20 and the anode electrode 80.

FIGS. 3A to 5C are electron microscopic images showing carbon nanotubes on a cathode electrode, in accordance with one embodiment of the present invention.

Carbon nanotubes were grown on various cathode electrodes. The cathode electrode was formed on a substrate, and a catalyst metal was prepared on the substrate. The cathode electrode and the catalyst metal were preprocessed in a chamber, and the carbon nanotubes were grown. The catalyst metal was nickel (Ni). The cathode electrode and the catalyst metal were preprocessed in an ammonia atmosphere, for example, by ammonia plasma. The carbon nanotubes were grown using a plasma including a mixture of ammonia ($NH_3$) and acetylene ($C_2H_2$). Examples of the catalyst metal that can be used for growing the carbon nanotubes include without limitation nickel (Ni), iron (Fe), and cobalt (Co). The substrate was a glass substrate, and the growing process was performed at a temperature of no more than about 500° C.

Figure 3A:
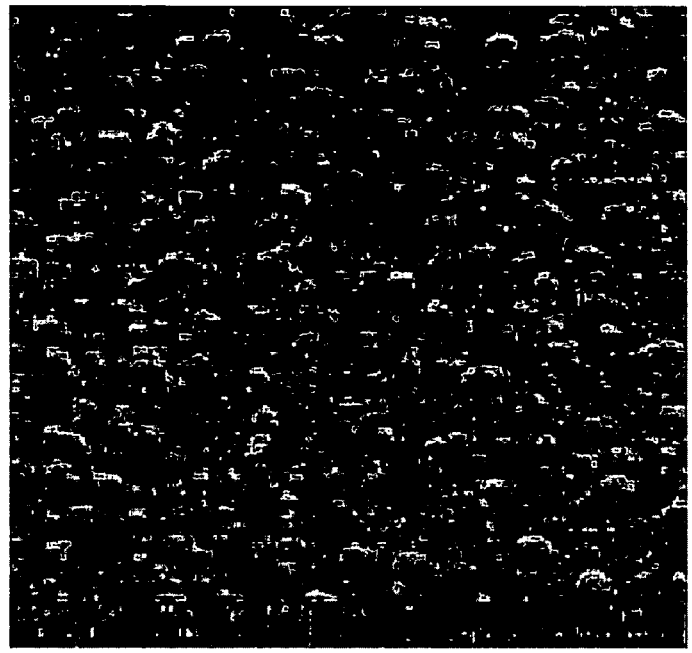
FIGS. 3A to 5C are electron microscopic images showing carbon nanotubes on a cathode electrode in accordance with one embodiment of the present invention.
Figure 3B:
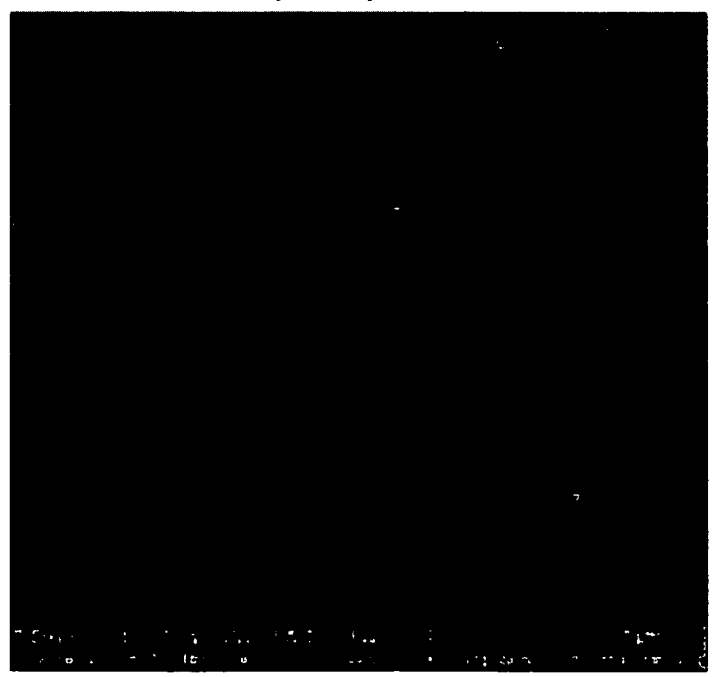
Figure 3C:
Figure 4A:
Figure 4B:
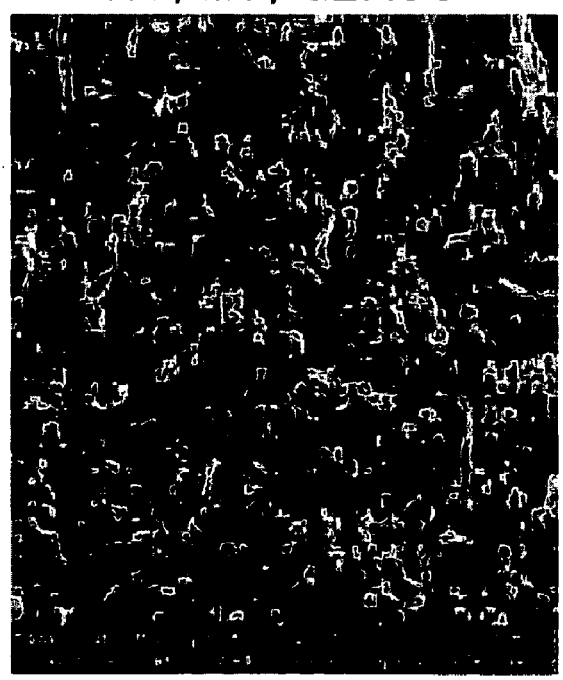
Figure 4C:
Figure 4D:
Figure 5A:
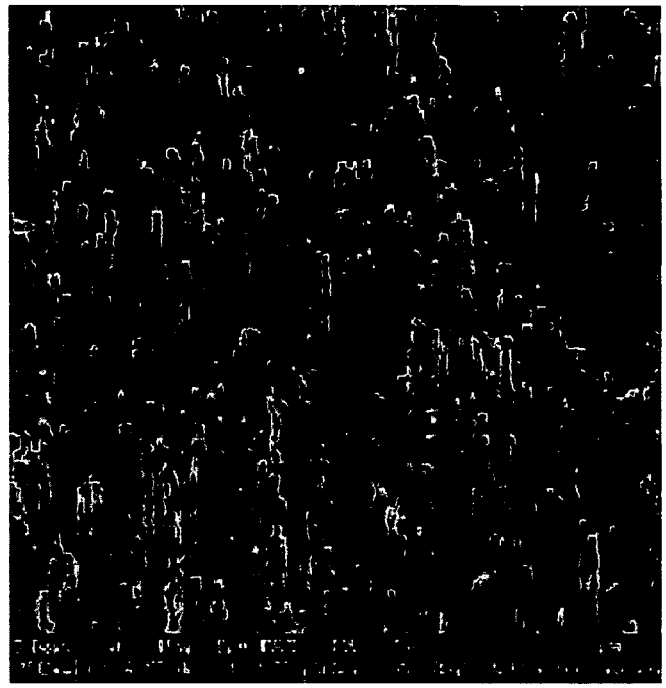
Figure 5B:
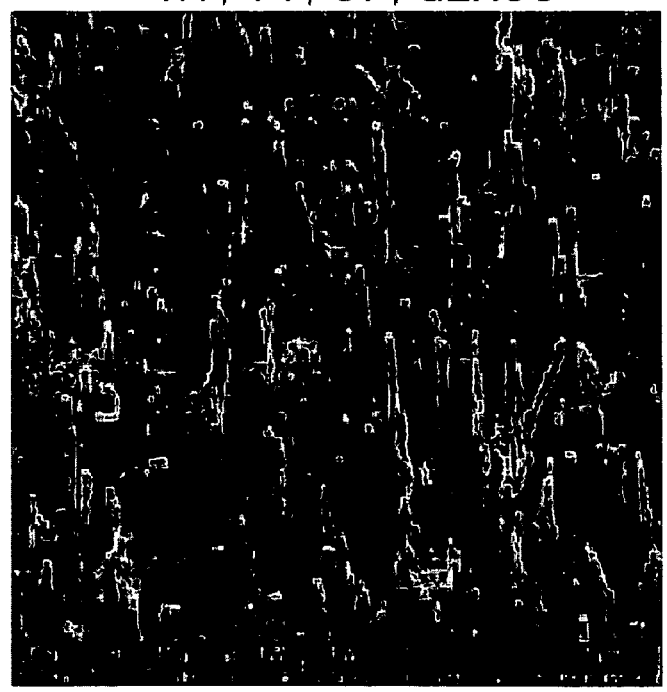
Figure 5C:
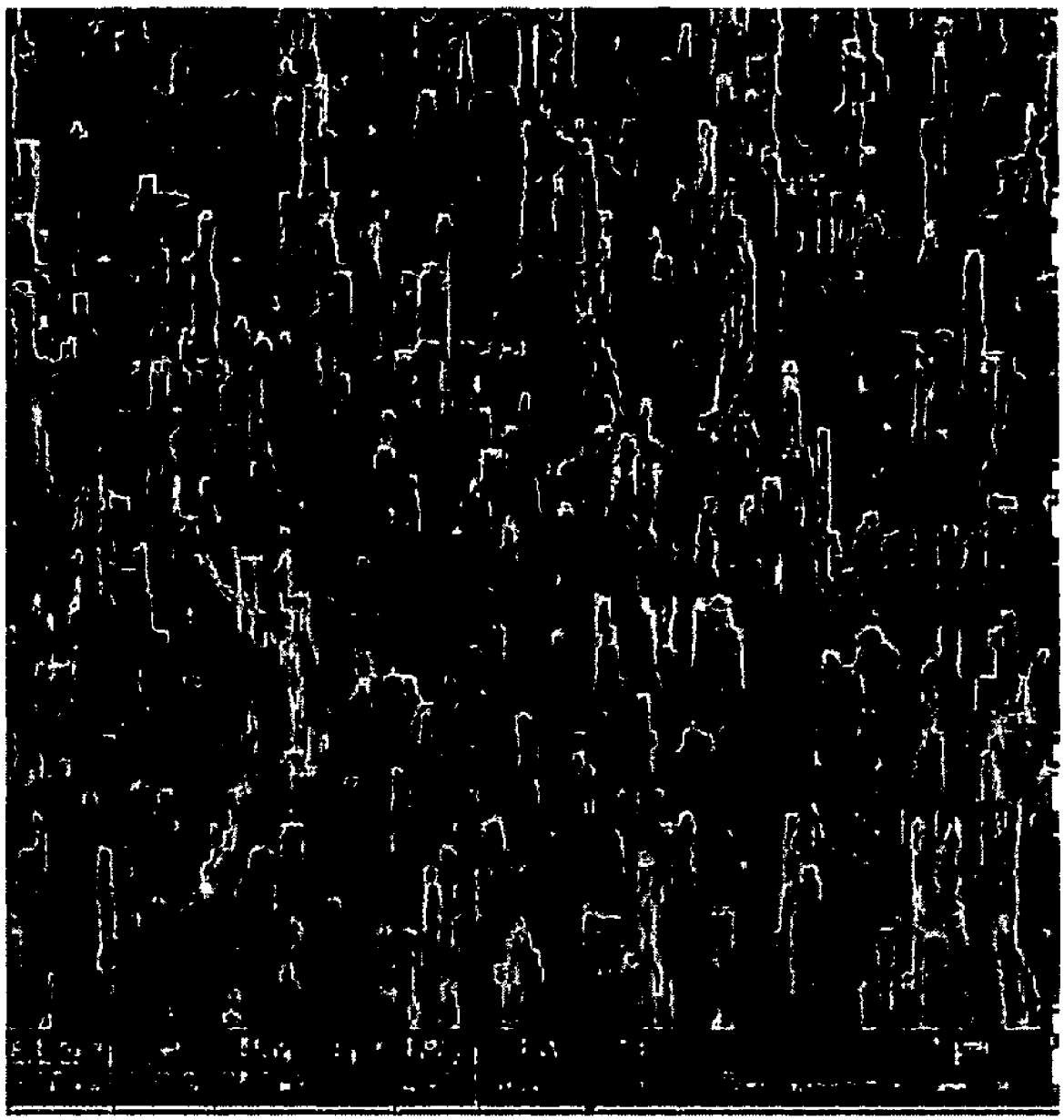

In FIGS. 3A to 3C, the cathode electrode of FIG. 3A, the cathode electrode of FIG. 3B, and the cathode electrode of FIG. 3C respectively include platinum (Pt), chromium (Cr), and tungsten (W). In FIGS. 4A to 4E, the cathode electrode of FIG. 4A, the cathode electrode of FIG. 4B, the cathode electrode of 4C, the cathode electrode of FIG. 4D, and the cathode electrode of FIG. 4E respectively include a molybdenum-tungsten (MoW) alloy, molybdenum (Mo), silver (Ag), copper (Cu), and aluminum (Al). In FIGS. 5A to 5C, the cathode electrodes of FIG. 5A and FIG. 5B include a titanium-platinum (Ti—Pt) layered structure and a titanium-chromium (Ti—Cr) layered structure, respectively. In FIG. 5C, the cathode electrode includes titanium (Ti). In FIGS. 3A to 5C, the catalyst metal is nickel (Ni), with the cathode electrode being interposed between the glass and the nickel (Ni).

Table 1 represents a current density and a growth of the carbon nanotubes on a selected floating metal, such as the growth of carbon nanotubes shown in FIGS. 3A to 5C.

TABLE 1

| Metal | Current Density (Log Scale) | Growth of Carbon Nanotube |
|---|---|---|
| Pd | −3.0 | — |
| Pt | −3.1 | X |
| Rh | −3.2 | — |
| Ir | −3.7 | — |
| Ni | −5.2 | — |
| Fe | −5.2 | — |
| Au | −5.7 | — |
| W | −5.9 | X |
| Cr | — | X |
| Ag | −6.1 | O |
| Nb | −6.4 | — |
| Mo | −6.5 | O |
| Cu | −6.7 | O |
| Ta | −7.0 | — |
| Bi | −8.0 | — |
| Al | −8.1 | O |
| Ti | −8.2 | O |
| MoW | — | O |

In Table 1, the metals are classified into a first group of metals having a charge transition rate of no less than about $10^{-6.0}$ $A/cm^2$, and a second group of metals and an alloy having a charge transition rate of no more than about $10^{-6.1}$ $A/cm^2$. The first group includes palladium (Pd), platinum (Pt), rhodium (Rh), iridium (Ir), nickel (Ni), iron (Fe), gold (Au), tungsten (W), and chromium (Cr). The second group includes silver (Ag), niobium (Nb), molybdenum (Mo), copper (Cu), tantalum (Ta), bismuth (Bi), aluminum (Al), titanium (Ti), and a molybdenum-tungsten (MoW) alloy.

An "X" entry in Table 1 indicates cases in which carbon nanotubes were not grown on the cathode electrode; a "O" entry in Table 1 indicates cases in which carbon nanotubes were grown on the cathode electrode; and a dashed entry (-) in Table 1 indicates cases in which the current density, the growth of the carbon nanotubes, or both, were not ascertainable.

In Table 1, the current density represents a variation in charge per unit area of a metal that was electrically floated, that is, an electric charge transition rate on a surface of a metal charged by a plasma gas. In Table 1, the current density is displayed on a log scale in units of $A/cm^2$. For example, when the current density is about $10^{-3.0}$, the corresponding log scale of the current density is about −3.0.

In FIGS. 3A to 3C, the carbon nanotubes were not grown on the cathode electrode. However, in FIGS. 4A to 5C, the carbon nanotubes were grown on the cathode electrode.

Referring to FIGS. 5A and 5B, the layered structure of the cathode electrode of FIG. 5A may employ a lower metal layer of the first group, including without limitation, platinum (Pt) or chromium (Cr), and an upper metal layer of the second group including titanium (Ti). In FIG. 5C, the cathode electrode employed a layer of titanium (Ti). The carbon nanotubes were grown on the upper metal layer of the second group. In other words, the growth of the carbon nanotubes was independent from the lower metal layer, and was dependent on the upper metal layer.

FIGS. 6A to 6D are electron microscopic images showing carbon nanotubes on a cathode electrode according to various source gas ratios in accordance with one embodiment of the present invention.

The carbon nanotubes were grown using a plasma including a mixture of ammonia ($NH_3$) and a hydrocarbon gas. In FIGS. 6A to 6D, the hydrocarbon gas was acetylene ($C_2H_2$) gas.

Figure 6A:
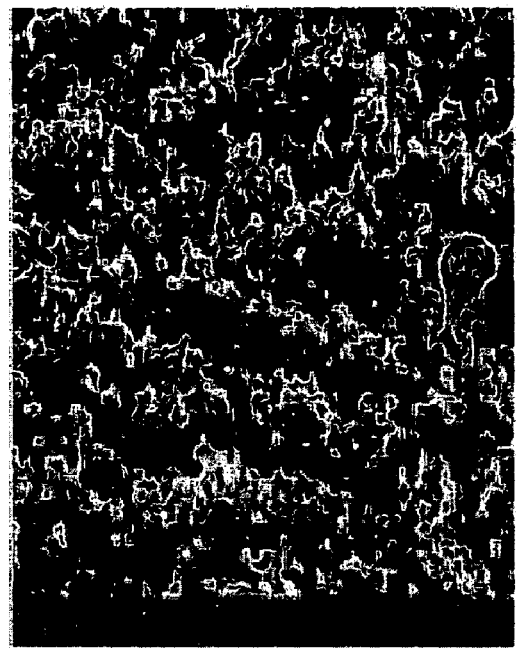
FIGS. 6A to 6D are electron microscopic images showing carbon nanotubes on a cathode electrode according to various source gas ratios in accordance with one embodiment of the present invention.
Figure 6B:
Figure 6C:
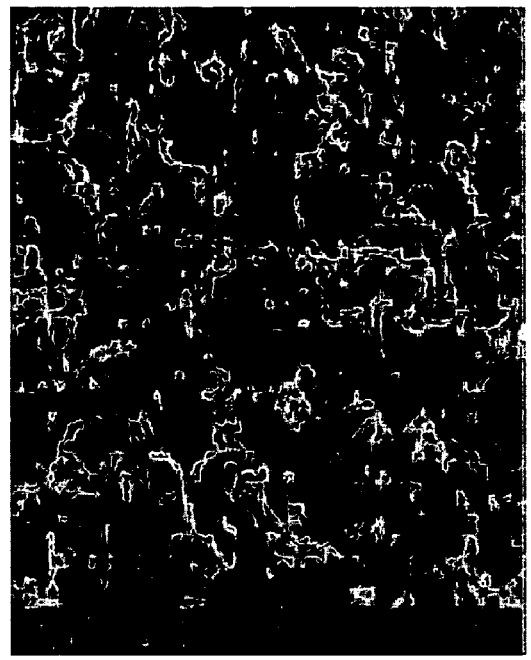
Figure 6D:
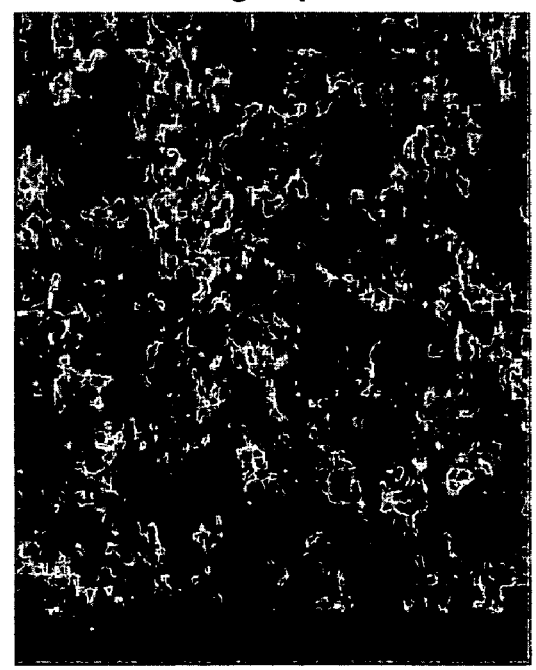

Referring to FIGS. 6A to 6D, a volumetric ratio of the ammonia ($NH_3$) to the acetylene ($C_2H_2$) gas was changed to test the growth of the carbon nanotubes. The volumetric ratio can be measured by the standard cubic centimeter (SCCM) unit, where one SCCM represents 1 $cm^3$ at 0° C. under one atmospheric pressure. In FIG. 6A, a volumetric ratio of the ammonia ($NH_3$) to the acetylene ($C_2H_2$) gas was about 1:1. In FIG. 6B, a volumetric ratio of the ammonia ($NH_3$) to the acetylene ($C_2H_2$) gas was about 2:1. In FIG. 6C, a volumetric ratio of the ammonia ($NH_3$) to the acetylene ($C_2H_2$) gas was about 4:1. In FIG. 6D, a volumetric ratio of the ammonia ($NH_3$) to the acetylene ($C_2H_2$) gas was about 6:1. For example, the ratio of 2:1 represented two ammonia molecules and one acetylene ($C_2H_2$) molecule. When the volumetric ratio of the ammonia ($NH_3$) to the acetylene ($C_2H_2$) gas was about 1:1 to about 4:1, the carbon nanotubes tended to grow. In particular, when the volumetric ratio of the ammonia ($NH_3$) to the acetylene ($C_2H_2$) gas was about 2:1, the carbon nanotubes grew in a vertical direction.

Figure 7A:
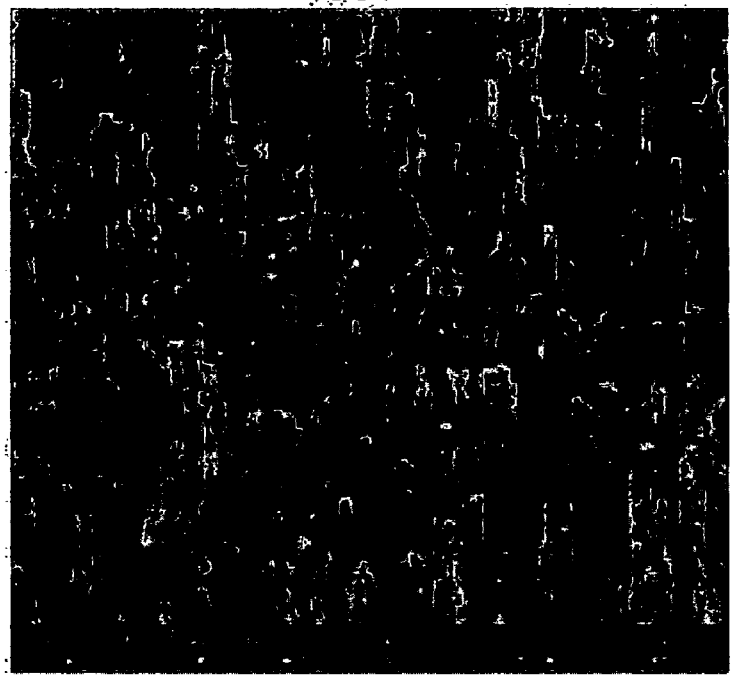
FIGS. 7A and 7B are electron microscopic images showing carbon nanotubes on a cathode electrode at various voltages in accordance with one embodiment of the present invention.
Figure 7B:
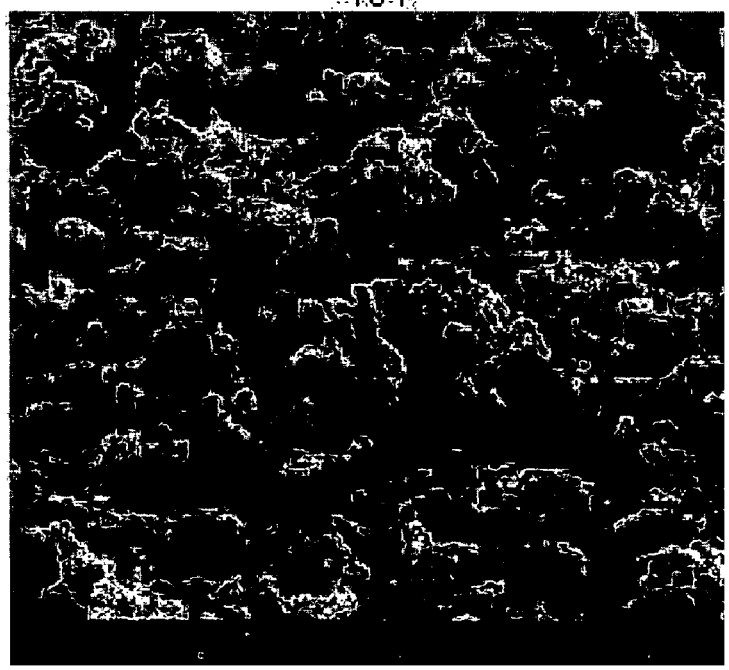

FIGS. 7A and 7B are electron microscopic images showing carbon nanotubes on a cathode electrode at various voltages, in accordance with one embodiment of the present invention.

In FIG. 7A, a level of a plasma voltage was about 400 V. In FIG. 7B, the level of the plasma voltage was about 40 V.

Referring to FIGS. 7A and 7B, a height of the carbon nanotubes formed at the plasma voltage of about 40 V was smaller in a vertical direction than that of the carbon nanotubes formed at the plasma voltage of about 400 V. In particular, when the plasma voltage was about 400 V, the carbon nanotubes grew in the vertical direction at a greater height than when the plasma voltage was about 40 V. Thus, a plasma voltage of about 400 V or more may be desirable.

FIGS. 8 to 13 are cross-sectional views illustrating a method of manufacturing a planar light source device in accordance with one embodiment of the present invention.

Figure 8:
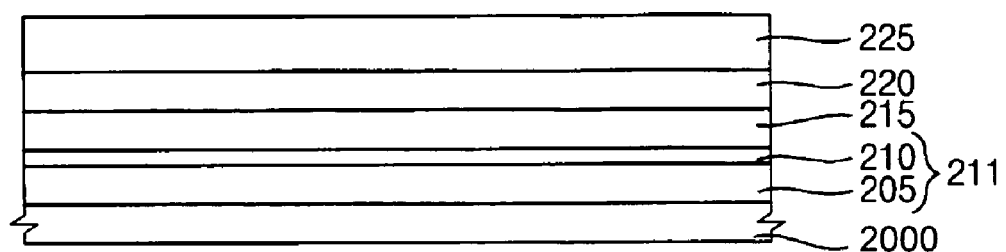
FIGS. 8 to 13 are cross-sectional views illustrating a method of manufacturing a planar light source device in accordance with one embodiment of the present invention.

Referring to FIG. 8, a cathode electrode 211 is formed on a substrate 2000. In particular, a lower cathode electrode layer 205 and an upper cathode electrode layer 210 are formed on the substrate 2000, in sequence, to form the cathode electrode 211. The upper cathode electrode layer 210 of the cathode electrode 211 includes a metal of a second group. Examples of the metal of the second group that can be used for the upper cathode electrode layer 210 include without limitation silver (Ag), lead (Pb), niobium (Nb), molybdenum (Mo), copper (Cu), tantalum (Ta), bismuth (Bi), aluminum (Al), and titanium (Ti). The second group may also include an alloy including without limitation, a molybdenum-tungsten (MoW) alloy. A current density of the second group typically is no more than about $10^{6.1}$ A/cm$^2$. Desirably, substrate 2000 of FIGS. 8-13 can be a constituent element of the planar light source device 400.

When the cathode electrode 211 has the double-layer structure including the lower cathode electrode layer 205 and the upper cathode electrode layer 210, the lower cathode electrode layer 205 includes the metal of a first group or the second group, and the upper cathode electrode layer 210 includes the metal of the second group. For example, the lower cathode electrode layer 205 may include chromium (Cr), and the upper cathode electrode layer 210 may include titanium (Ti).

The lower cathode electrode layer 205 and the upper cathode electrode layer 210 may be formed through a sputtering method.

In FIG. 8, the cathode electrode 211 may be an integrally formed conductor so that the cathode electrode 211 may not have an isolated portion.

An insulating layer 215, a gate electrode layer 220 and a photoresist layer 225 are formed on the lower substrate 2000 having the cathode electrode 211, in sequence.

Figure 9:
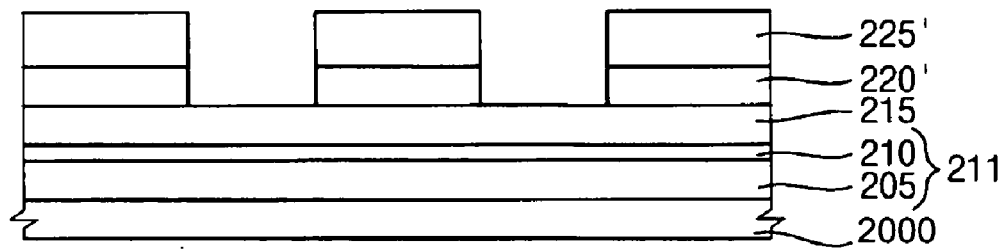

Referring to FIG. 9, the gate electrode layer 220 is patterned through a photolithography process. In particular, the photoresist layer 225 that is formed on the gate electrode layer 220 is exposed using an exposure unit. The photoresist layer 225 is developed to be patterned to form a photoresist pattern 225'. The gate electrode layer 220 is partially etched using the photoresist pattern 225' as an etching mask. The gate electrode 220' includes the metal of the first group. Alternatively, the gate electrode 220' may include chromium (Cr) as shown in FIG. 8. The gate electrode 220' may also include substantially the same material as the lower cathode electrode 205. When the gate electrode 220' includes substantially the same material as the lower cathode electrode 205, manufacturing costs are decreased. Examples of an insulating material that can be used for the insulating layer 215 include an organic material, silicon oxide, silicon nitride, etc. These can be used alone of in a combination thereof.

The gate electrode 220' may be an integrally formed conductor so that the gate electrode 220' may not have an isolated portion. In FIGS. 1 and 9, the planar light source device generates light having uniform luminance, and does not include pixels that are independently driven.

Figure 10:
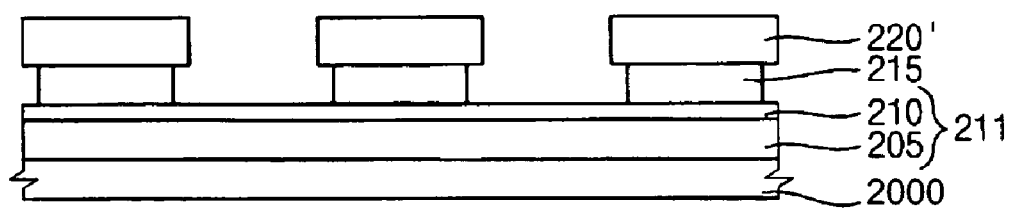

Referring to FIG. 10, the insulating layer 215 is partially etched using the gate electrode 220' as an etching mask, so that the cathode electrode 210 is partially exposed. The insulating layer 215 may be dry etched or wet etched. When the insulating layer 215 is wet etched, the insulating layer 215 is isotropically etched so that a portion of the insulating layer 215 under a side of the gate electrode 220' is recessed, thereby forming an undercut.

Figure 11:
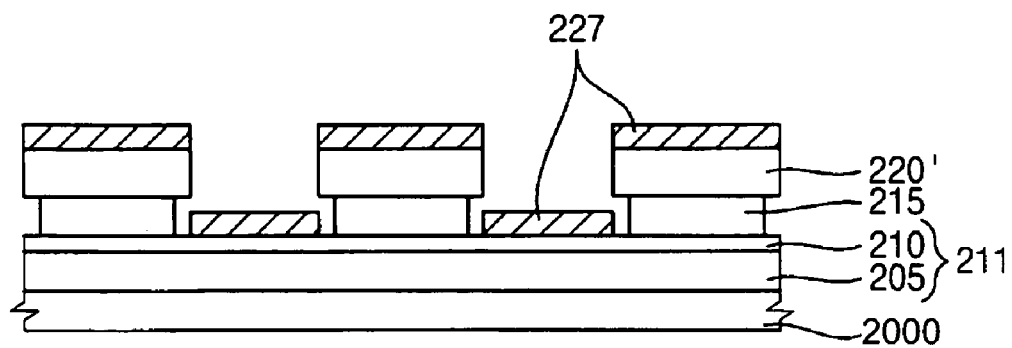

Referring to FIG. 11, a catalyst metal layer 227 for the carbon nanotubes is formed on the lower substrate 2000 having the gate electrode 220', and the cathode electrode 210 is partially exposed through an opening between adjacent portions of the gate electrode 220'. Examples of the catalyst metal that can be used form the catalyst metal layer 227 include nickel (Ni), iron (Fe), cobalt (Co), etc. The catalyst metal layer 227 may be formed through a sputtering method.

Figure 12:
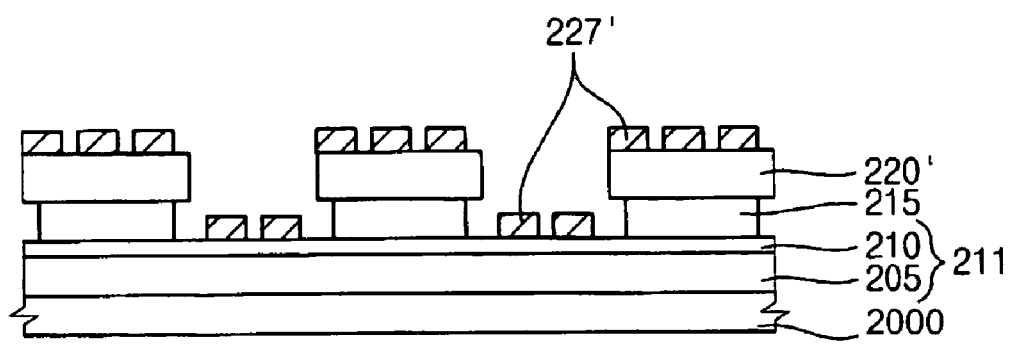

Referring to FIG. 12, the lower substrate 2000 having the catalyst metal layer 227 is preprocessed. The lower substrate 2000 is divided into a region in which a plurality of catalyst metal seeds 227' is formed and a region between adjacent catalyst metal seeds 227'. For example, the lower substrate 2000 having the catalyst metal layer 227 is preprocessed using ammonia plasma. The catalyst metal seeds 227' function as seeds for growing carbon nanotubes.

Figure 13:
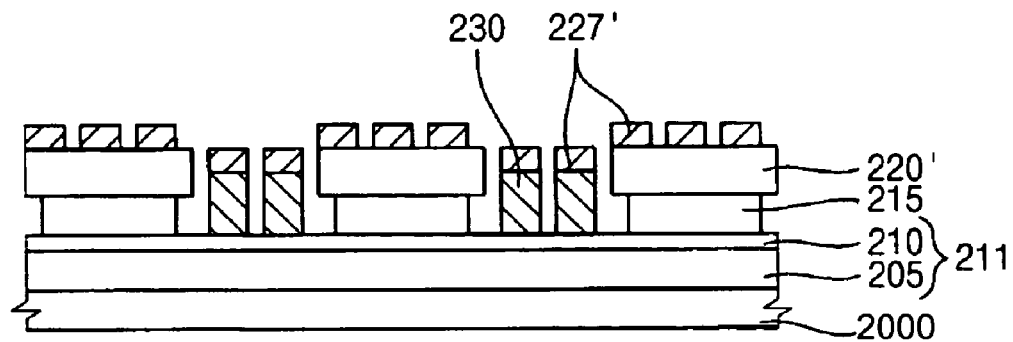

Referring to FIG. 13, the carbon nanotubes 230 grow based on the catalyst metal seeds 227'. In particular, the carbon nanotubes 230 grow using a plasma including a mixture of ammonia ($NH_3$) and a hydrocarbon. The hydrocarbon may be acetylene ($C_2H_2$). The carbon nanotubes 230 grow on the metal of the second group, which corresponds to the catalyst metal seeds 227'. Although the catalyst metal seeds 227' are on the metal of the first group, the carbon nanotubes 230 may not grow on the metal of the first group. Thus, in FIG. 13, the carbon nanotubes 230 only grow on the cathode electrode 210 in the region surrounded by the adjacent portions of the gate electrode 225'.

The processes of FIGS. 12 and 13 may be performed in situ. That is, the processes may be performed in a chamber without being exposed to external air. In addition, the processes of FIGS. 12 and 13 may include one photo process.

An upper substrate having a transparent electrode and a fluorescent layer is combined with the lower substrate having the carbon nanotubes to form the planar light source device. A spacer may be formed between the upper substrate and the lower substrate.

In FIGS. 1 to 13, the planar light source device 400 is used for a backlight assembly of the LCD device 1000. However, the planar light source device 400 may be used in various other fields, for example, as a generic lighting device.

According to the present invention, the field emission-type planar light source device, and the LCD device having the planar light source device, can generate light, for example, without using mercury.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A planar light source device comprising:
    a lower substrate;
    a cathode electrode including at least two layers on the lower substrate, an uppermost layer of the cathode electrode including at least one selected from the group consisting of silver (Ag), lead (Pb), niobium (Nb), molybdenum (Mo), copper (Cu), tantalum (Ta), bismuth (Bi), aluminum (Al), titanium (Ti), and a molybdenum-tungsten (MoW) alloy;

a gate electrode on the cathode electrode, the gate electrode being electrically insulated from the cathode electrode;

a catalyst metal layer disposed on the gate electrode without any carbon nanotube grown on the gate electrode;

a carbon nanotube grown on the cathode electrode and entirely separated from the lower substrate by the cathode electrode to form an emitter tip; and an upper substrate facing the lower substrate, the upper substrate including a fluorescent material and a transparent electrode.

2. The planar light source device of claim 1, wherein the gate electrode comprises at least one selected from the group consisting of lead (Pb), palladium (Pd), platinum (Pt), rhodium (Rh), iridium (Ir), nickel (Ni), iron (Fe), gold (Au), tungsten (W), and chromium (Cr).

3. The planar light source device of claim 1, wherein the cathode electrode of a double-layer structure comprises a lower cathode electrode layer including chromium, and an upper cathode electrode layer including titanium.

4. The planar light source device of claim 3, wherein the lower cathode electrode layer comprises substantially the same material as the gate electrode.

5. A liquid crystal display (LCD) device comprising:
a planar light source device including:
a lower substrate;
a cathode electrode including at least two layers on the lower substrate, an uppermost layer of the cathode electrode including at least one selected from the group consisting of silver (Ag), lead (Pb), niobium (Nb), molybdenum (Mo), copper (Cu), tantalum (Ta), bismuth (Bi), aluminum (Al), titanium (Ti), and a molybdenum-tungsten (MoW) alloy;
a gate electrode on the cathode electrode, the gate electrode being electrically insulated from the cathode electrode;
a catalyst metal layer disposed on the gate electrode without any carbon nanotube grown on the gate electrode;
a carbon nanotube grown on the cathode electrode and entirely separated from the lower substrate by the cathode electrode to form an emitter tip; and
an upper substrate facing the lower substrate, the upper substrate including a fluorescent material and a transparent electrode; and
a liquid crystal display panel on the planar light source device.

6. A planar light source device comprising:
a lower substrate;
a cathode electrode including at least one layer on the lower substrate;
a gate electrode on the cathode electrode and being electrically insulated from the cathode electrode, the cathode electrode being exposed through an opening of the gate electrode;
a catalyst metal layer on the gate electrode without any carbon nanotube grown on the gate electrode;
a carbon nanotube on the cathode electrode in the opening of the gate electrode, the carbon nanotube being grown using the catalyst metal layer; and
an upper substrate facing the lower substrate, the upper substrate including a fluorescent material and a transparent electrode,
wherein the carbon nanotube is entirely separated from the lower substrate by the cathode electrode.

7. The planar light source device of claim 6, wherein the lower cathode electrode layer comprises substantially the same material as the gate electrode.

8. An LCD device comprising:
a planar light source device including:
a lower substrate;
a cathode electrode including a chromium layer and a titanium layer on the lower substrate;
a gate electrode on the cathode electrode and being electrically insulated from the cathode electrode, the gate electrode including chromium, the cathode electrode being exposed through an opening of the gate electrode;
a catalyst metal layer disposed on the gate electrode without any carbon nanotube grown on the gate electrode;
a carbon nanotube grown on the cathode electrode in the opening of the gate electrode and entirely separated from the lower substrate by the cathode electrode; and
an upper substrate facing the lower substrate, the upper substrate including a fluorescent material and a transparent electrode;
an LCD panel on the planar light source device; and
an optical sheet interposed between the planar light source device and the liquid crystal display panel.

* * * * *